United States Patent Office 2,749,343
Patented June 5, 1956

2,749,343

1,3,5-TRI LOWER ALKYL-4-AMINO URACILS

Willy Stoll, Basel, Switzerland, assignor to J. R. Geigy A. G., Basel, Switzerland, a Swiss firm No Drawing. Application January 29, 1954,
Serial No. 407,145

Claims priority, application Switzerland February 6, 1953

4 Claims. (Cl. 260—256.4)

The present invention is concerned with new nuclear substituted 4-amino-uracils as well as processes for the production thereof.

It has been found that nuclear substituted 4-amino-uracils (1.3.5-trisubstituted 2.6-dioxo-4-amino-tetrahydro-pyrimidines) of the general formula:

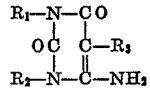

wherein $R_1$, $R_2$ and $R_3$ each represents a member selected from the group consisting of ethyl and n-propyl radicals, have an excellent diuretic action on being administered per os. They can be produced easily by various methods.

Thus, N.N'-disubstituted ureas of the general formula:

$$R_2—NH—CO—NH—R_1 \qquad II$$

can be condensed with α-substituted cyanoacetic acids of the general formula:

if necessary with the help of a condensation agent such as, e. g. acetic anhydride, to form trisubstituted cyano-acetyl ureas of the general formula:

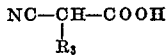

These can then be converted into the end products of the general Formula I by treating with alkaline substances. If the alkyl radicals $R_1$ and $R_2$ differ from each other, mixtures of isomeric compounds with regard to the substituents of the endocyclic nirogen atoms are obtained, whereby the isomer with the ethyl group in position 1, i. e. $R_1$ predominates.

The N.N'-disubstituted ureas of the general Formula II which are necessary as starting materials are N.N'-diethyl urea, N-ethyl-N'-propyl urea and N.N'-di-n-propyl urea which are known and can be easily obtained by reacting ethyl or propyl amine with ethyl or propyl isocyanate; compounds with both substituents alike can also be obtained by reacting 1 mol of phosgene with 2 mols of ethylamine or n-propylamine respectively.

The α-substituted cyanoacetic acids of the general Formula III are the α-ethyl- and the α-n-propyl cyanoacetic acids.

A single homogeneous reaction product, also with $R_1$ and $R_2$ differing from each other and also products wherein $R_1$ represents an n-propyl and $R_2$ an ethyl group can be obtained if the trisubstituted cyanacetyl ureas of the general Formula IV serving as intermediate products are produced by reacting cyanaceto-N-alkylamides of the general formula:

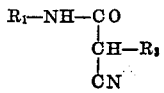

with alkyl isocyanates of the general formula:

A further modification of the process first above mentioned consists in condensing in an anhydrous medium in the presence of alkaline condensation agents such as e. g. sodium alcoholates, N.N'-disubstituted ureas of the general Formula II with esters, in particular the ethyl or methyl esters, of α-substituted cyanacetic acids of the general Formula III to form end products of the general Formula I.

Further, the new trisubstituted 4-amino-uracils can also be produced by introducing the ethyl or n-propyl radical in the 1-position of disubstituted 4-amino-uracils of the general formula:

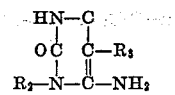

by treating such 4-amino-uracils with a suitable alkylating agent in the presence of an alkali. Ethyl and propyl bromide or iodide or diethyl sulphate can be used as alkylating agents. The starting materials of the general Formula VII can be obtained in a manner analogous to that for the corresponding trisubstituted 4-amino-uracils by condensing low molecular monoalkyl or monoalkenyl ureas with α-substituted cyanacetic acids of the general Formula III.

The following examples serve to further illustrate the production of the new compounds. Parts are given as parts by weight and the temperatures are in degrees centigrade.

*Example*

10.3 parts of 3.5-diethyl-4-amino-uracil (obtained by condensing N-ethyl urea with α-cyano-n-butyric acid) are dissolved in 100 parts of ethyl alcohol. 20 parts of 20% caustic soda lye and 21 parts of n-propyl iodide are added and the whole is boiled under reflux for 3 hours. The alcohol is then distilled off, the syrupy residue is stirred with a little 20% caustic soda lye to remove any unreacted starting product, the lye is poured off, the residue is washed with cold water and finally crystallised from a great quantity of boiling water. After recrystallising from water, 3.5-diethyl-1-n-propyl-4-amino-uracil is obtained as colourless shining crystals which contain 1 mol of crystal water. The crystals melt at about 95°, at 100° the crystal water is given off, the product recrystallises at about 110°, and melts then instantaneously at 146°.

The following compounds for example of the general formula:

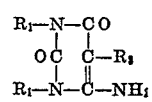

can also be prepared by methods described above:

| No. | $R_1$ | $R_2$ | $R_3$ | M. P., degrees |
|---|---|---|---|---|
| 1 | $C_2H_5$ | $C_2H_5$ | $C_2H_5$ | 170 |
| 2 | n-$C_3H_7$ | n-$C_3H_7$ | $C_2H_5$ | 107–108 |
| 3 | n-$C_3H_7$ | n-$C_3H_7$ | n-$C_3H_7$ | 136–137 |

The 4-amino-uracils according to this invention may be associated with a solid pharmaceutical carrier to form pharmaceutical compositions. These may be in the form of capsules, powders, tablets or any other form which is suitable for administration per os. The compositions may be obtained by admixing the active ingredient, i. e. the new 4-amino-uracils with pharmaceutical carriers such as cornstarch, lactose, stearic acid, talc, magnesium stearate, etc.

What I claim is:

1. Nuclear substituted 4-amino-uracils of the general formula:

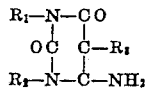

wherein $R_1$, $R_2$ and $R_3$ each represent a member selected from the group consisting of ethyl and n-propyl radicals.

2. The compound of the formula

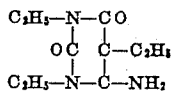

3. The compound of the formula

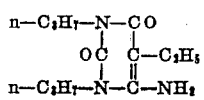

4. The compound of the formula

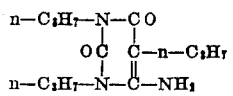

References Cited in the file of this patent
UNITED STATES PATENTS 2,567,651  Papesch et al. ---------- Sept. 11, 1951

OTHER REFERENCES

Kattus: Bull. Johns Hopkins Hosp., vol. 89, pp. 1–8 (July 1951).